United States Patent [19]

Torck et al.

[11] Patent Number: 4,647,703
[45] Date of Patent: Mar. 3, 1987

[54] PROCESS FOR PRODUCING A HYDROCARBON CUT OF HIGH OCTANE NUMBER BY ETHERIFICATION OF OLEFINS

[75] Inventors: Bernard Torck, Boulogne sur Seine; Pierre Amigues, La Muladiere; Yves Glaize, Saint Symphorien d'Ozon; Henri Grangette, Lyons; Jean Laurent, Oullins; Fred Fitoussi, Lyons, all of France

[73] Assignees: Institut Francais du Petrole, Rueil-Malmaison; Elf France, Paris, both of France

[21] Appl. No.: 753,465

[22] Filed: Jul. 10, 1985

[30] Foreign Application Priority Data

Jul. 10, 1984 [FR] France .............................. 84 10978

[51] Int. Cl.$^4$ .............................................. C07C 41/66
[52] U.S. Cl. ...................................... 568/697; 44/53; 44/56
[58] Field of Search ....................... 568/697; 44/53, 56

[56] References Cited

U.S. PATENT DOCUMENTS 4,193,770  3/1980  Chase et al. ............................ 44/53
4,324,924  4/1982  Torck et al. ......................... 568/697

Primary Examiner—Howard T. Mars
Attorney, Agent, or Firm—Millen & White

[57] ABSTRACT

Process for producing a hydrocarbon cut of high octane number by etherification of an olefin-containing hydrocarbon cut.

The olefinic cut, to which methanol is added, passes into an etherification reactor (1) wherefrom are separated (3) a bottom product (15) containing ethers, and a top product (14) containing residual methanol and unreacted light olefins. This top product passes into an etherification reactor (2) and then is washed with water (8).

The top product is finally admixed with the bottom product.

The so-obtained motor-fuel has a higher octane number than that of the initial hydrocarbon cut.

5 Claims, 1 Drawing Figure

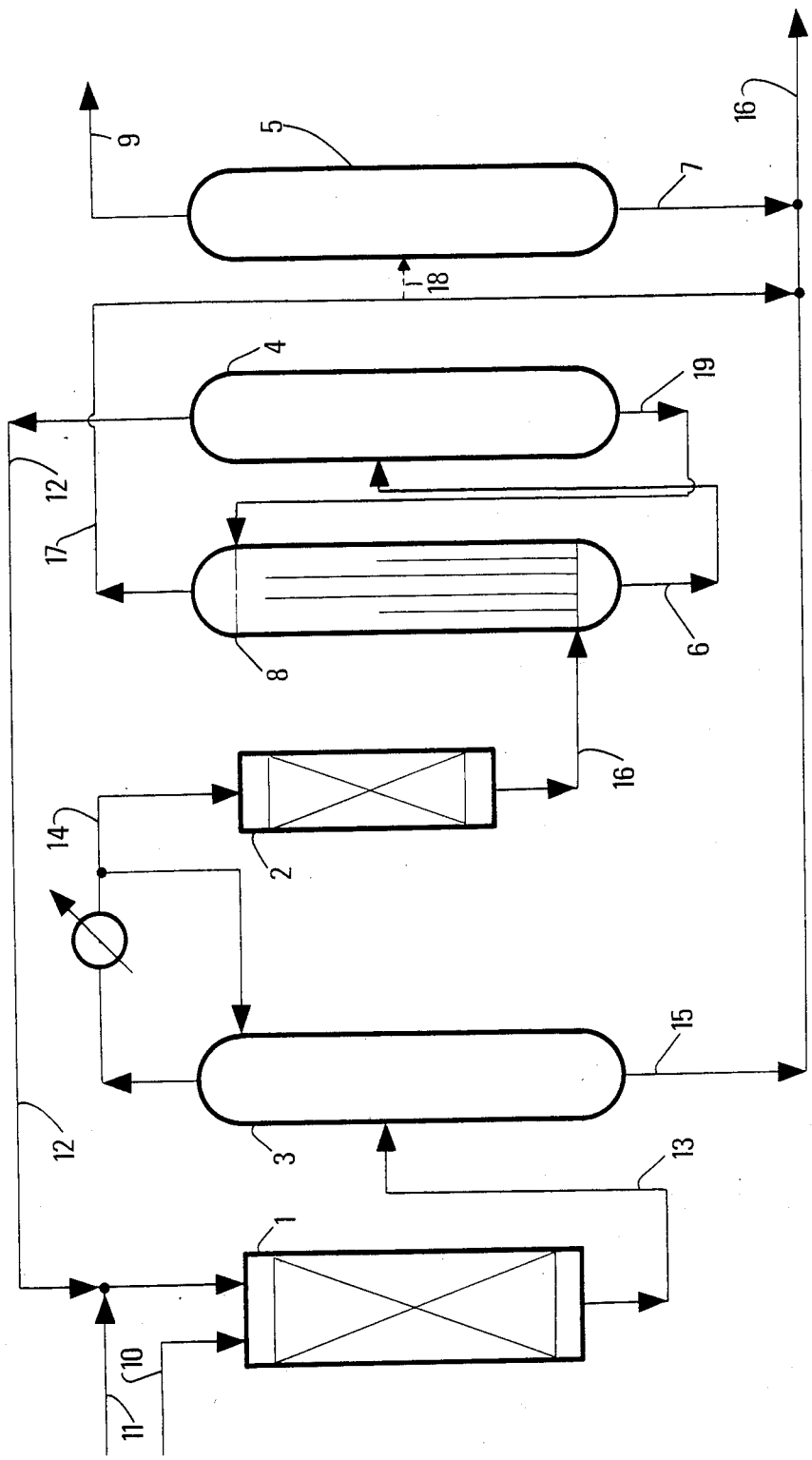

PROCESS FOR PRODUCING A HYDROCARBON CUT OF HIGH OCTANE NUMBER BY ETHERIFICATION OF OLEFINS

The invention relates to a process for increasing the octane numbers of unsaturated gasolines, particularly cracking gasolines.

BACKGROUND OF THE INVENTION

In view of the expected decrease for the next years of the heavy fractions in the oil demand, as a result of the development of new primary energy sources, cracking gasolines will constitute in the future a substantial part of the motor gasolines.

As compared with reformates and alkylates, the octane numbers of cracking gasolines are relatively low (clear RON=90-92, clear MON 79-80). Since, moreover, the European regulation provides for a decrease of the tetraalkyl lead content of gasolines, in a first stage to 0.15 g Pb/l, and will subsequently forbid any lead content in a part of the motor fuels, it seems that the octane specifications of premium gasoline will be difficult to comply with when using cracking gasolines.

In order to meet with these requirements without too much increasing the severity of the refining operations, other means shall be found to increase the octane quality of these gasolines.

Generally, these cracking gasolines, for sweetening requirements, are separated into light and heavy fractions. The light cracking gasolines contain a substantial amount of olefins, for example 30-40%, including tertiary olefins, isoamylenes, isohexenes and isoheptenes.

As for isobutene, these tertiary olefins may be converted to ethers by reaction with an alcohol, such as methanol, in the presence of an acid catalyst. This etherification has the following advantages : increase of the octane numbers of gasoline, due to the fact that ethers have higher octane numbers than the olefins from which there are formed; decrease of the gasoline olefin content, upgrading of methanol to premium gasoline without the difficulties arising when using free methanol.

The more usual ethers are MTBE (methyl tert-butyl ether) and TAME (tert-amylmethyl-ether).

As it is known, the reaction between methanol and tertiary olefin is balanced and hence it is difficult to obtain high conversion rates. On the other hand, the equilibrium is the less displaced in favor of ethers formation as the molecular weight of the olefin is higher. Thus, whereas it is possible for isobutene to obtain, by mere passage over the catalyst, conversion rates of about 93 to 98%, for isoamylenes, the conversion rates remain in the range of about 65-75% when the use of a large methanol excess is not desirable.

The residual methanol content at the output of the reactor is another important problem inasmuch as the introduction of free methanol in a motor-fuel is not allowed, except in the presence of a co-solvent, such as t-butyl alcohol.

Hence, when it is desired to obtain acceptable conversion rates of tert-olefins, it becomes necessary to use a very large methanol excess with respect to stoichiometry; but, in these conditions, the methanol amount contained in the effluent is too high for being easily removed by conventional processes such as azeotropic distillation with hydrocarbons and recycling to the reactor, as described in the French Pat. No. 2 411 881.

When all the methanol is to be removed by azeotropic distillation, as described in the above-mentioned patent, then the molar ratio methanol/olefins, at the reactor input, must be limited. The recycling to the reactor of a part of the azeotropic pentanes pentenes methanol distillate as described in the above-mentioned patent, provides only for a relatively low isoamylenes conversion of about 70%.

SUMMARY OF THE INVENTION

The object of the present invention is to produce a hydrocarbon cut of high octane number, by a process as hereinafter defined:

Process for producing a hydrocarbon cut of high octane number from a hydrocarbons mixture containing at least one saturated hydrocarbon, at least one first etherifiable olefin having a number of carbon atoms (n) from 4 to 6 and at least one second etherifiable olefin having a number of carbon atoms higher than that of the first etherifiable olefin, characterized by the following steps of:

(a) reacting said hydrocarbons mixture with methanol in the presence of an etherification catalyst in a first reaction zone, so as to form a first reaction mixture containing ethers, residual etherifiable olefins and unreacted methanol, (b) fractionating the resultant reaction mixture, by distillation into a top product, substantially free of ether and containing at least 70% of the residual methanol, at least 70% of the residual etherifiable olefin of (n) carbon atoms and less than 30% of the residual etherifiable olefin of higher number of carbon atoms, and a bottom product containing substantially all the ethers formed in step (a), less than 30% of the residual methanol, less than 30% of the residual etherifiable olefin of (n) carbon atoms and at least 70% of the residual etherifiable olefin of higher number of carbon atoms, (c) reacting the top product with methanol in the presence of an etherification catalyst, in a second reaction zone, separate from the first reaction zone, so as to form a second reaction mixture containing at least one ether and unreacted methanol, (d) separating at least the major part of the unreacted methanol from the second reaction mixture, (e) admixing at least a portion of the product from step (d) free of at least the major part of its methanol content, with at least a part of the bottom product from step (b), so as to form a hydrocarbon cut of high octane number.

Accordingly, an etherified gasoline, substantially free of methanol and directly usable as motor-fuel, is obtained. The etherification of unsaturated gasolines, as described in the present patent application, further provides for the upgrading to premium gasoline of substantial amounts of methanol, as ether.

For example, the light catalytic cracking gasoline has a final distillation point which may range from 60° to 140° C. and hence comprises hydrocarbons having 5, 6 and 7 carbon atoms, including olefins having a tertiary double bond on which methanol can react to give methyl tert-alkyl ethers.

BRIEF DESCRIPTION OF THE DRAWING

The accompanying drawing illustrates the further description of the invention, as applied either to the treatment of an olefinic gasoline or to a mixture of olefinic gasoline with an isobutene-containing C4 cut.

For the treatment of an olefinic gasoline containing $C_5$–$C_7$ isoolefins, gasoline (10) is introduced into reactor 1, or into as assembly of several reactors, with methanol (11) in such an amount that at least 70% of the unreacted methanol (preferably the whole methanol amount) may be removed from the gasoline with hydrocarbons having a boiling point lower than that of the ether resulting from the isoamylenes etherification. The reactor effluent, containing ethers corresponding to the etherification of isoamylenes, isohexenes and isoheptenes, is fed through line 13 to a distillation column 3, so as to separate, through 14, methanol by azeotropy with $C_5$ and $C_6$ hydrocarbons having a boiling point lower than that of TAME. It may be advantageous to operate said column under pressure since the methanol content of azeotropes increases with pressure, thus giving the possibility to use a more substantial amount of methanol at the input of reactor 1 and to obtain higher isoolefins conversion rates and higher methanol amounts converted to ethers. A part of the gasoline containing substantially all the ethers formed in reactor 1 and partly, or preferably completely free of the methanol excess, is withdrawn, through line 15, from the bottom of the distillation column. This gasoline part may be directly used as motor-fuel. Eventually, some methanol may be left in the gasoline when the regulation concerning the motor-fuels allows it, with or without co-solvents; then a part of the methanol excess may be withdrawn through line 15. It is then possible to admit a larger methanol amount at the input of reactor 1.

$C_5$ and $C_6$ hydrocarbons, forming with methanol the distillate of column 3, contain isoamylenes and a part of the unreacted isohexenes of reactor 1. This distillate is fed through line 14 to reactor 2 so as to convert these isoolefins to ethers and increase the methanol amount converted to ether. The conversion rate is the higher as the molar ratio methanol/isoolefins is higher.

The effluent from reactor 2 is fed (line 16) to a water washing section, shown as a water extraction column 8 operating with countercurrently flowing water and hydrocarbons. The so-obtained methanol solution (line 6) is distilled in column 4 ; the obtained methanol is recycled to reactor 1 (or reactor 2) through line 12. Water free of methanol issuing from the bottom of said column is recycled to the washing column through line 19.

The $C_5$–$C_6$ gasoline fraction, containing ethers and free of methanol, is supplied to line 17 and admixed with the heavy fraction from line 16, to be used as motor-fuel.

This motor-fuel, whose volume is increased as a result of the addition of methanol, upgraded as ethers, is characterized by octane numbers higher than those of the initial gasoline. When treating a mixture of olefinic gasoline and isobutene-containing $C_4$ cut, said mixture is injected in reactor 1 with methanol, preferably in such an amount that the excess remaining, after reaction may be removed with hydrocarbons having a boiling point adapted for the separation of the lighter ether, MTBE, i.e. $C_4$ and $C_5$ hydrocarbons.

The reactor effluent is hence separated into a gasoline containing MTBE, TAME, ethers corresponding to $C_6$ and $C_7$ olefins, discharged from the bottom of the distillation column 3 through line 15, and a distillate containing methanol stripped by azeotropy, with $C_4$ hydrocarbons and a portion of the $C_5$ hydrocarbons. This distillate, containing unreacted isobutene and isoamylenes, is fed through line 14 to reactor 2.

The effluent from this reactor is supplied to the washing section in order to recover methanol, which is recycled to reactor 1. The effluent, free of methanol, is fed through line 18 to a distillation column 5, from the bottom of which is separated a $C_5$ cut containing MTBE and TAME, which is fed through line 7 to the motor-fuel pool, and from the top of which is distillate consisting of the $C_4$ cut free of isobutene is discharged through line 9.

EXAMPLES

The following examples illustrate the invention. The parts are expressed by weight, except as otherwise stated.

EXAMPLE 1 (COMPARISON)

A light catalytic cracking gasoline, whose final distillation point is 135° C., essentially containing $C_5$, $C_6$ and $C_7$ hydrocarbons including 7.4% by weight of 2-methyl-1-butenes, and 2.4% of isohexenes and 2% of isoheptenes which are etherifiable by methanol, is subjected to etherification.

The etherification reaction is conducted in a reactor containing a fixed bed of sulfonic resin, such as AMBERLYST 15 (trademark).

Gasoline is introduced into the reactor with methanol in such amounts that the molar ratio of methanol to the sum of etherifiable olefins is 4. The reactor temperature is maintained at 70° C. and the feed rate gasoline charge+methanol is such that the VVH is 2.

The reactor effluent is directly fed to a water extraction column, operating counter-currently, to remove methanol which is recycled to the reactor after separation of water by distillation. The gasoline, free of methanol and whose amount increased by 4.1% by weight as a result of the methanol introduced as ether, contains 8.3% of TAME, 3.7% of isohexenes methyl ethers and 1.3% of isoheptenes methyl ethers. The isopentenes, isohexenes and isoheptenes conversion rates are respectively 80, 70 and 50%. The Research octane number increase obtained by etherification of the light gasoline is 1.5.

EXAMPLE 2

This example shows, comparatively with example 1, that, by etherification according to the process of the invention, more methanol can be introduced into gasoline in combined form, so as to obtain a gasoline of higher octane number, while reducing the amount of gasoline to treat by water washing. 100 parts of catalytic cracking light gasoline identical to that used in example 1 and 13.8 parts of methanol are introduced in reactor 1 at 70° C. so that the VVH be is 3.6. The molar ratio of methanol to the sum of etherifiable olefins is 2.3.

The reactor effluent containing residual etherifiable olefins is fed through line 13 to the distillation column 3 operating at 8 abs. bars. From the bottom 56.5 parts of gasoline, free of methanol and containing 95% of etherifiable residual $C_7$ olefins and 3% of etherifiable residual $C_5$ olefins, are withdrawn.

The distillate discharged at the top consists of 47 parts of gasoline light fractions and 10 parts of methanol. It contains 97% of the etherifiable $C_5$ olefins and 5% of the etherifiable $C_7$ olefins.

This distillate, substantially free of ether, is fed through line 14 to reactor 2 at a VVH of 2.2. The reaction temperature is maintained at 70° C. In this reactor, the major part of the remaining isoamylenes is converted to TAME with a high conversion rate as a result of the high molar ratio of methanol to isoamylenes (8.2) at the input of this reactor.

The reactor effluent is fed to the water extraction column to remove methanol (9.1 parts) which is recycled to reactor 1 after distillation in column 4. Gasoline, free of methanol, discharged through line 17, is admixed in line 15 with gasoline withdrawn from the bottom of column 3 and containing ethers and $C_6$ and $C_7$ hydrocarbons.

Thus, 104.7 parts of gasoline are recovered. The methanol amount of 4.7 parts, introduced as ethers, is higher than in example 1.

On the other hand, the total conversion of isoamylenes is 93.6%. The isohexenes and isoheptenes conversion rates are respectively 65 and 40%. The gasoline, free of methanol, discharged through line 16, contains 9.6% of TAME, 4.3% of isohexenes methyl ethers and 1% of isoheptenes methyl ethers.

The Research octane number increase obtained by gasoline etherification is here of 2, hence higher than that obtained in example 1, although the methanol amount used in the reaction was lower.

EXAMPLE 3

This example shows that it is possible and even advantageous to etherify, in the same unit, a light catalytic cracking gasoline and a $C_4$ cut obtained from a catalytic cracking unit.

By this way, more methanol in combined form is introduced into gasoline and the octane number increase is also higher.

100 parts of the same light catalytic cracking gasoline, 80 parts of mixture of a catalytic cracking $C_4$ cut with a steam-cracking $C_4$ cut, containing 25% of isobutene, and 21.9 parts of methanol, are introduced at 70° C. in reactor 1, containing a sufonic resin as catalyst, at such a rate that the VVH is 2.8.

The reactor effluent, containing etherifiable residual olefins, is fed through line 13 to column 3 operating at 8 abs. bars. From the bottom 105 parts of gasoline free of methanol and containing MTBE, TAME and $C_7$ and $C_8$ ethers, are withdrawn. This gasoline contains 99% of etherifiable residual $C_7$olefins and 2% of residual isobutene.

The distillate discharged at the top (1% of etherifiable residual $C_7$ olefins and 98% of residual isobutene) contains 90.8 parts of light hydrocarbons and 7.2 parts of methanol. This distillate is fed at 70° C. through line 14 to reactor 2 at a VVH of 2.4. In this reactor, the remaining isobutene and isoamylenes are converted to ethers at high conversion rates since the molar ratio of methanol to etherifiable olefins is high (3,3) at the reactor input.

The effluent from this reactor is fed to the water extraction column to remove methanol (5.5 parts) which is recycled to reactor 1. This effluent is then supplied through line 17 and then line 18 to the distillation column 5 so as to separate the $C_4$ (62 parts) from a $C_5$ gasoline containing MTBE and TAME. This $C_5$ gasoline is admixed through line 27 with gasoline discharged from column 3 through line 15. Thus, 136 parts of a gasoline free of methanol and containing 23.4% by weight of MTBE, 7.4% of TAME, 3.3% of isohexenes methyl ethers and 0.97% of isoheptenes methyl ethers are recovered.

The total conversion rates of isobutene, isoamylenes, isohexenes and isoheptenes are respectively 99.6, 87.2, 50 and 40%. The Research octane number increase obtained by combined etherification of gasoline and $C_4$ cut, amounts to 8.

The methanol amount introduced as ethers represents 11.9% of the obtained gasoline.

EXAMPLE 4

100 parts of a distillation fraction of the effluent from a catalytic cracking unit, boiling between $-12°$ C. and 60° C., containing $C_4$, $C_5$ and $C_6$ hydrocarbons including 6.7% of isobutene, 12.5% of isoamylenes and 0.45% of isohexenes, are fed to a reactor containing a sulfonic resin DUOLITE C 23 (trade mark). This fraction is introduced into the reactor at 70° C. with 15.6 parts of methanol so that the molar ratio of methanol to the sum of etherifiable olefins is 1.61. The total charge feed rate is so adjusted that the VVH is 2.9.

The reactor effluent is fed to the distillation column 3 operating at 8 abs. bars. 30.5 parts of a fraction, free of methanol, containing 33% of MTBE, 42% of TAME, 1% of isohexenes methyl ether, 90% of the residual etherifiable $C_6$ olefins and 4% of the residual isobutene, are withdrawn from the bottom.

From the top of the column, 85.4 parts of light fraction containing 9.3% of methanol, stripped by azeotropy, and the remaining portion of the hydrocarbons, are withdrawn.

This distillate is fed at a VVH of 2.1 to reactor 2 containing the same resin maintained at 70° C.

In this reactor, the unconverted isobutene and isoamylenes are etherified by methanol with high conversion rates as a result of the high molar ratio of methanol to olefins at the reactor input. The effluent from this reactor is fed to the water extraction column to remove methanol (7.9 parts) which is recycled to reactor 1 after separation in column 4. The effluent, free of methanol, is fed, through lines 17 and 18, to column 5, so as to separate the $C_4$ (38 parts) from the gasoline containing MTBE and TAME.

This gasoline is admixed, through line 7, with that issued from column 3 through line 15. There are thus obtained 71 parts of a gasoline free of methanol and containing 15 % of MTBE, 23.8% of TAME and 0.4%. of isohexenes methyl ethers.

The total conversion rates of isobutene, isoamylenes and isohexenes are respectively 99.7, 92.5 and 50%.

The Research octane number increase of the $C_5{}^+$ cut of said distillation fraction is 6.5.

The amount of methanol, introduced as ethers, is 13% of the obtained gasoline.

What is claimed as the invention is:

1. A process for producing an ether containing hydrocarbon cut of high octane number from an ether containing mixture of hydrocarbons comprising at least one saturated hydrocarbon, at least one first etherifiable olefin having a number (n) of carbon atoms from 4 to 6 and at least one second etherifiable olefin having a number of carbon atoms higher than that of the first etherifiable olefin, comprising the following steps of:
   (a) reacting said hydrocarbons mixture with methanol in the presence of an etherification catalyst in a first reaction zone so as to form a first reaction mixture comprising ethers, residual etherifiable olefins and unreacted methanol,
   (b) fractionating the resultant reaction mixture, by distillation, to a top product substantially free of ether and containing at least 70% of the residual methanol, at least 70% of the residual etherifiable olefin having (n) carbon atoms and less than 30% of the residual etherifiable olefin of higher number of carbon atoms, and to a bottom product containing substantially all the ethers formed in step (a), less than 30% of the residual methanol, less than 30% of the residual etherifiable olefin of (n) carbon atoms and at least 70% of the residual etherifiable olefin of higher number of carbon atoms, (c) reacting the top product with methanol, in the presence of an etherification catalyst, in a second reaction zone separate from the first reaction zone, so as to form a second reaction mixture containing at least one ether and unreacted methanol, (d) separating at least the major part of the unreacted methanol from the second reaction mixture, and, (e) admixing at least a part of the product from step (d), free of at least the major part of its methanol content, with at least a part of the bottom product from step (b), so as to form an ether-containing hydrocarbon cut of high octane number.

2. A process according to claim 1, wherein the first etherifiable olefin contains 5 carbon atoms.

3. A process according to claim 2, wherein the hydrocarbons mixture is an essentially $C_5$–$C_7$ cut.

4. A process according to claim 1, wherein the first etherifiable olefin contains 4 carbon atoms and wherein at least the major part of the hydrocarbons containing 4 carbon atoms, present in the second reaction mixture at the end of step (c), are removed from said mixture before carrying out step (e).

5. A process according to claim 1, wherein step (d) is performed by water washing, the obtained methanol aqueous solution is distilled, the so-separated methanol is recycled to step (a) or to step (c) and the recovered water to step (d).

* * * * *